Figure 1:
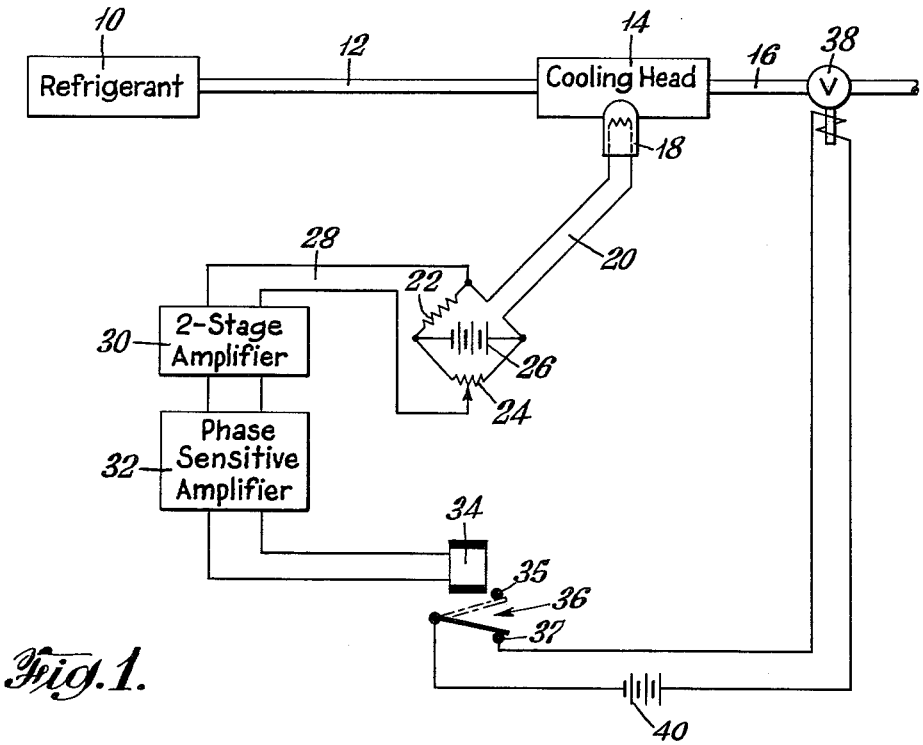

June 11, 1963   R. P. SKINNER   3,092,977
CONTROL APPARATUS FOR LOW TEMPERATURE REFRIGERATION SYSTEM
Filed Nov. 17, 1959

INVENTOR.
RANSOM P. SKINNER
BY William F. Mesinger
ATTORNEY

United States Patent Office 3,092,977
Patented June 11, 1963

3,092,977
CONTROL APPARATUS FOR LOW TEMPERATURE REFRIGERATION SYSTEM
Ransom P. Skinner, Indianapolis, Ind., assignor to Union Carbide Corporation, a corporation of New York
Filed Nov. 17, 1959, Ser. No. 853,537
2 Claims. (Cl. 62—202)

This invention relates to improved apparatus for controlling the temperature of a low temperature refrigeration system. More particularly it relates to such a system for regulating the flow of an expendable refrigerant to devices for cooling small areas.

Infra-red sensing apparatus, for example, is becoming increasingly useful in military and commercial applications for detecting the location of objects or identifying materials by the infra-red radiation emitting from the object or material. The homing mechanism on certain air-to-air missiles, for example, is operated by means of such a sensing apparatus. It has been found that the infra-red detection cell, especially for airborne application, is most effective when maintained at an extremely low temperature, such as the temperature of liquid nitrogen. A considerable effort has therefore been expended by the industry to produce apparatus which effectively cools an infra-red sensing element to low temperatures, such as those of liquid nitrogen, hydrogen and helium, and which also does not use prohibitive amounts of the liquid refrigerant. The present invention is concerned with such cooling apparatus.

In the more common types of infra-red detection apparatus the detection cell itself must be located either in the surface or in a small projection on the surface of a missile or aircraft. In such applications it is usually not possible or practical to locate a refrigerant reservoir near the cell for obvious structural reasons. Accordingly a reservoir for liquid refrigerant is located remotely from the cell and the refrigerant is fed through a conduit to a suitable chamber positioned adjacent to the cell where it is in turn vaporized to cool the cell. The refrigerant vapors are then led out of the chamber through an exhaust line. This refrigerant vaporization chamber will hereinafter be referred to as a cooling head.

Some of the presently practiced methods of controlling the flow of refrigerant to the sensing device or cell have utilized a fixed orifice or an adjustable orifice (needle valve) in the refrigerant exhaust line from the sensing device cooling head. These methods have several disadvantages. When a fixed orifice is used and made small in size in order to reduce the total refrigerant flow, it requires an undesirably long time for the sensing device to be initially cooled to the desired low operating temperature. When a large fixed orifice is used in order to get rapid cool-down, excessive amounts of refrigerant would be used after cool-down. A variable orifice, such as a needle valve, can be used in experimental apparatus and manually controlled to maintain the desired refrigerant flow, but this is impractical for automatic devices needed for airborne operation, for example.

It is accordingly an object of the present invention to provide a refrigeration system for automatically maintaining the temperature of an infra-red sensing device at a substantially constant predetermined optimum temperature.

It is a further object to provide such a system for controlling the flow of a refrigerant liquid to a cooling head for such a sensing device located remotely from the refrigerant container.

It is a still further object to provide such a system for sensing the temperature of the cooling head and automatically controlling the flow of refrigerant in accordance therewith.

Figure 2:
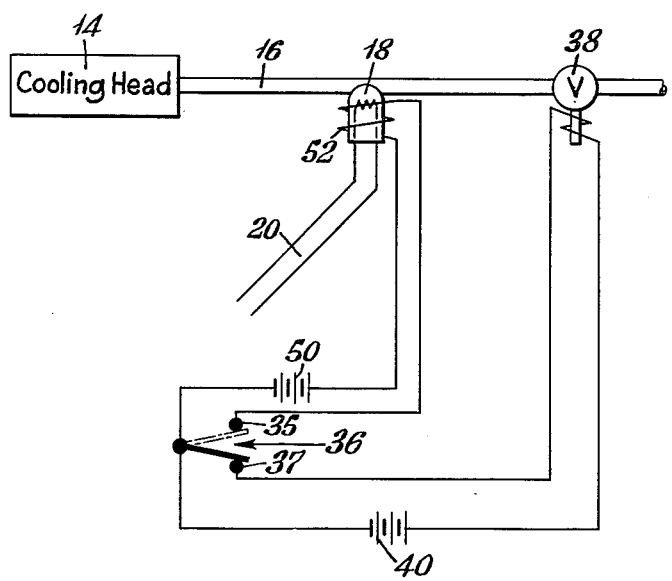

Other objects and advantages will be apparent from the specification and drawings in which:

FIG. 1 is a schematic diagram of the refrigerant flow control apparatus of the invention; and FIG. 2 is a schematic partial diagram of another embodiment of the invention.

The objects of the invention are accomplished in general by placing a thermistor or similar type temperature-sensitive element in a cooling head refrigerant system. The thermistor is connected through an amplifier-control circuit to a control valve in the gas phase portion of the refrigerant system. As the temperature of the refrigerant system rises and falls, the thermistor-valve combination controls the refrigerant flow so as to maintain a fairly constant temperature ($\pm$ about 8° F. or less) in the cooling head without using undue amounts of refrigerant.

In describing the invention it is to be understood that the refrigerant source is preferably a closed insulated container wherein the refrigerant is stored under pressure and vaporization of the refrigerant due to heat leak maintains a pressure build-up therein. It is this pressure that is normally relied on to provide the liquid refrigerant flow.

In FIG. 1 liquid phase refrigerant from container 10 passes through line 12 into infra-red sensing device cooling head 14 where the refrigerant picks up heat and is vaporized. A cooling head useful for this purpose comprises a small reservoir adapted for mounting adjacent the sensing device or detection cell and which stores minute quantities of liquid refrigerant such as liquid nitrogen wherein the nitrogen cools the sensing device or detection cell by vaporizing in the chamber. The refrigerant exhaust gas then passes through line 16. A thermistor temperature-sensitive element 18 is placed in or near cooling head 14 so as to be affected by the temperature of the cooling head. A thermistor is well known in the art as being a material, such as nickel oxide, that has a rapid, non-linear change in electrical resistance with respect to temperature. Usually the thermistor increases in resistance as the temperature decreases. This change in electrical property can be used to trigger electronic control or measuring circuits. In the practice of the present invention a thermistor enclosed in a glass sheath, for example, was satisfactorily employed. Examples of thermistors which are useful with the present invention are: Keystone Carbon Co. miniature No. D with a 225–250 Beta characteristic and Fenwal type 7000–12. The latter is useful only when mounted in the refrigerant exhaust line. Thermistor 18 is connected through lines 20 to a typical Wheatstone bridge circuit including load resistor 22, temperature-adjusting potentiometer 24 and power supply 26. This circuit is in turn connected through lines 28 to a 2-stage amplifier 30 and then to a phase sensitive amplifier 32. The output of this latter amplifier is connected to the control coil 34 of a single pole-double throw switch 36. The throw arm and the contact 37 of this switch can be connected across the control coil of a solenoid valve 38 in series with a power source 40. Valve 38 is conveniently located in the exhaust line 16 from the cooling head 14 when liquid nitrogen refrigerant is used. In some applications of the present invention a high pressure gas is passed to a cryostat where it is converted to liquid refrigerant which is then passed to the cooling head. In this latter modification the valve 38 would be located in the high pressure gas line upstream from the cryostat. In either case, the valve is conveniently located in a gas line to eliminate the mechanical and heat transfer problems of operating a valve for low temperature liquids.

The apparatus of this invention operates in the following manner. As long as the cooling head 14 is above liquid nitrogen temperature, the resistance of thermistor 18 operates the control circuit so as to maintain valve 38 in the open position to allow the flow of refrigerant into cooling head 14. Once the temperature of the cooling head 14 decreases to the desired level, switch 36 is caused to operate and open the circuit which closes valve 38. As the temperature of the cooling head 14 increases above this desired level, the thermistor sensing element causes switch 36 to again close on contact 37 thus opening valve 38. This cyclic operation can maintain the temperatrue in cooling head 14 to within 8° F. or less of the desired temperature. The desired temperature control point is regulated by the setting of variable potentiometer 24. In the circuit shown here, when switch 36 is connected with contact 35, valve 38 is closed, and when the switch is connected with contact 37, the valve is open. The illustrated circuit thus used is a normally closed valve 38. This is preferable since it enables the refrigerant pressure to more easily be maintained. A normally open valve can alternatively be used so that refrigerant flow can be maintained even in the event of a power failure in the control circuit. It is within the knowledge of those skilled in the art to modify this illustrated circuit to use a normally open valve 38. This is accomplished by reversing the electrical connections to contacts 35 and 37.

It is preferred that the thermistor be mounted in close proximity to the cooling head vaporization chamber in order to readily detect temperature variations at that point. When physical size and mounting relationships prevent this, the thermistor is positioned in the exhaust line from the cooling head. When the thermistor is so positioned, the preferred modification of FIG. 2 can be used for more precise temperature control. In this drawing the bridge circuit amplifier, phase sensitive amplifier, and relay coil have been omitted since they are identical to those shown in FIG. 1. Contact 35 of switch 36 is connected in series with power source 50 and a heater 52 which latter item is in close proximity to thermistor 18. When the temperature of the gas in line 16 decreases to a predetermined desired level, thermistor 18 causes switch 36 to shift from contacts 37 to contacts 35. This closes valve 38 and supplies power to heater 52. This heater, which is conveniently about 1200 ohms resistance and operates from an 8 volt power source, starts to warm the thermistor 18 in anticipation of the normal warming of cooling head 14 caused by a cessation of refrigerant flow. Thus thermistor 18 will cause switch 36 to be actuated and cause valve 38 to open at a smaller increment in temperature increase of the gas in line 16 than would be necessary if the temperature of the gas in line 16 alone controlled the thermistor. In this fashion the temperature fluctuations in cooling head 14 can be minimized.

If the temperature in the cooling head is to be maintained at some value above the boiling point of the liquid refrigerant, a single thermistor sensing device is adequate. When excessive refrigerant reaches the cooling head, the resistance change of the thermistor is sufficient to actuate the control circuit and stop the flow. When the temperature in the cooling head is to be maintained at the boiling point of the refrigerant, an unstable situation could arise if the electrical circuit drifted off the control point. Since the refrigerant being supplied to the cooling head is at its lowest temperature, the thermistor might not be able to actuate the control circuit and close the valve. If a second thermistor is positioned in the exhaust line in electrical series with the first thermistor in the cooling head, the change in resistance of the second thermistor caused by drop in the temperature of the gas reaching this point would be sufficient to actuate the control circuit and close the valve. This combined circuit thus operates to open and close the control valve in a similar manner to the single thermistor circuit described above.

As an illustration of the commercial utility of the present invention, a prior are circuit using a manually operated needle valve in the exhaust line was used to supply liquid nitrogen refrigerant to an infra-red sensing head. The valve was adjusted only infrequently in an attempt to simulate actual operation in an airborne missile wherein manual adjustments of the refrigerant source could occur only prior to launching. The temperature at the cooling head varied widely and the source of refrigerant was exhausted within about two hours. This run was then repeated wherein constant attention was given and manual adjustment of the needle valve occurred at frequent intervals as determined by the temperature in the sensing head which was measured by means of a thermocouple. Somewhat improved temperature control was obtained and the same amount of refrigerant supply was extended to about six hours. It should be noted that constant human attention was required to obtain these useful results. In contrast to this, the present invention (embodiment of FIG. 1) was used to automatically obtain substantially constant temperature in the sensing head with the refrigerant consumption equal to or better than that obtained by constant manual control.

It is to be noted that the amplifiers and power supplies shown may be constructed of any of the various miniaturized circuit components presently available such as transistors, tubes, batteries, etc. The entire control circuit can thus be made to occupy very little space and have minimum weight.

The present invention thus makes it possible to provide a refrigeration system using expendable refrigerant for cooling infra-red detection cells which provides very accurate temperature control at a predetermined optimum value with economy of refrigeration and optimum operation of the infra-red sensing device. The resultant apparatus is also relatively uncomplicated, inexpensive, and light in weight making it especially adaptable for missile use. Such apparatus of the present invention may also be employed for supplying refrigerant to cooling devices for masers and other electronic equipment as well as small scale cooling chambers.

While certain preferred embodiments of the invention have been shown and described, it is to be understood that certain modifications and improvements could be made by a person skilled in the art without departing from the spirit and scope thereof.

What is claimed is:

1. A refrigerating system for cooling an infra-red detection cell which comprises a cooling head for mounting adjacent to the detection cell, a first conduit for carrying liquid refrigerant directly to the cooling head, where it is vaporized and a second conduit for carrying vaporized refrigerant away from the cooling head, valve means in said second conduit for controlling the flow of refrigerant in the system, a temperature sensing device adjacent to the cooling head, circuit means associated with said sensing device for developing a signal proportional to the temperature of the sensing device, and means for utilizing such signal to operate the valve means, said temperature sensing device comprising a thermistor located in the second conduit between the cooling head and the valve means, and heating means for heating the thermistor when the valve means is closed.

2. A refrigeration system for an infra-red detection cell which comprises a cooling head for the detection cell, a first conduit means for carrying liquid refrigerant directly to the cooling head where it is vaporized, second conduit means for carrying vaporized refrigerant from the cooling head, valve means located in said second conduit means for controlling refrigerant flow, thermistor means for sensing the temperature at a desired point in said system, said thermistor means being a single element located in the second conduit means between the cooling head and the valve means, a heating element for heating the thermistor means when the valve means is closed, a bridge circuit of which the thermistor forms one leg for developing an unbalance signal when the temperature being sensed departs from a predetermined level, amplifier means for developing an output signal responsive to the unbalance signal from the bridge circuit, and means for operating the valve means in response to the output signal from the amplifier means.

References Cited in the file of this patent
UNITED STATES PATENTS

| | | |
|---|---|---|
| 1,658,187 | Dyer | Feb. 7, 1928 |
| 2,083,611 | Marshall | June 15, 1937 |
| 2,453,584 | Newton | Nov. 9, 1948 |
| 2,475,755 | Pearson | July 12, 1949 |
| 2,496,816 | Schlumbohm | Feb. 7, 1950 |
| 2,635,225 | Hadady | Apr. 17, 1953 |